(12) United States Patent
Arquero et al.

(10) Patent No.: US 10,839,716 B2
(45) Date of Patent: Nov. 17, 2020

(54) MODIFYING DRIVING BEHAVIOR

(71) Applicant: INTERNATIONAL BUSINESS MACHINES CORPORATION, Armonk, NY (US)

(72) Inventors: Gregg M. Arquero, Poughkeepsie, NY (US); Eli M. Dow, Wappingers Falls, NY (US); Syed F. Hossain, Hopewell Junction, NY (US); Joshua A. Schaeffer, White Plains, NY (US); Yunli Tang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 362 days.

(21) Appl. No.: 15/335,489

(22) Filed: Oct. 27, 2016

(65) Prior Publication Data

US 2018/0122259 A1 May 3, 2018

(51) Int. Cl.
*G09B 19/00* (2006.01)
*G09B 19/16* (2006.01)

(52) U.S. Cl.
CPC ................. *G09B 19/167* (2013.01)

(58) Field of Classification Search
CPC .................................................. G09B 19/167
USPC ........................................................ 434/66
See application file for complete search history.

(56) References Cited

U.S. PATENT DOCUMENTS

| 2004/0102898 | A1 | 5/2004 | Yokota et al. | |
| 2004/0193347 | A1 | 9/2004 | Harumoto et al. | |
| 2005/0131597 | A1* | 6/2005 | Raz | G07C 5/085 701/29.1 |
| 2006/0181433 | A1 | 8/2006 | Wolterman | |
| 2008/0255722 | A1* | 10/2008 | McClellan | B60R 25/102 701/31.4 |
| 2008/0319602 | A1* | 12/2008 | McClellan | G07C 5/008 701/31.4 |
| 2009/0210257 | A1* | 8/2009 | Chalfant | G06Q 40/08 705/4 |
| 2010/0045452 | A1* | 2/2010 | Periwal | B60Q 9/00 340/439 |
| 2010/0205012 | A1* | 8/2010 | McClellan | G06Q 40/08 705/4 |
| 2010/0238009 | A1* | 9/2010 | Cook | G06Q 10/10 340/439 |
| 2013/0124038 | A1 | 5/2013 | Naboulsi | |

(Continued)

FOREIGN PATENT DOCUMENTS

JP 2010112798 A 5/2010

*Primary Examiner* — Robert P Bullington
(74) *Attorney, Agent, or Firm* — Cantor Colburn LLP; Teddi Maranzano

(57) ABSTRACT

Embodiments include methods, systems, and computer program products for modifying driving behavior. Aspects include obtaining driving data for a driver. Then developing, by a processor, a driving profile based on the driving data for the driver, wherein the driving profile includes one or more driving behaviors. Aspects also include obtaining location data for the driver and obtaining a set of driving rules from one or more databases based upon the location data for the driver. Additionally, aspects include comparing, by the processor, the driving profile to the set of driving rules to derive a set of suggested driving changes.

20 Claims, 5 Drawing Sheets

(56) References Cited

U.S. PATENT DOCUMENTS

2014/0170602 A1\* 6/2014 Reed .................... G09B 19/167
 434/62

\* cited by examiner

MODIFYING DRIVING BEHAVIOR

BACKGROUND

The present disclosure relates to driving behavior, and more specifically, to modifying driving behavior.

Cross country travel has been made possible by the creation of a national interstate highway system that connects nearly every city in the country. As more and more people elect to travel by motor vehicle to cities instead of by airplane or train, drivers are going to be introduced to areas that they are unaccustomed to operating their motor vehicle. Different driving jurisdictions (e.g., states, counties, and cities) have a variety of traffic customs, rules, and laws that may conflict with other driving jurisdictions. Some businesses, such as trucking companies, employ drivers that travel great distances through many driving jurisdictions to deliver goods. Certain driving behaviors are common amongst political subdivisions such as adherence to speed limit requirements. Other driving behaviors may be common in one area and illegal in another, such as the usage of handheld electronic devices.

SUMMARY

Embodiments include a computer-implemented method for modifying driving behavior, the method including obtaining driving data for a driver. The method then includes developing, by a processor, a driving profile based on the driving data for the driver, wherein the driving profile includes one or more driving behaviors. The method also includes obtaining location data for the driver and obtaining a set of driving rules from one or more databases based upon the location data for the driver. Additionally, the method includes comparing, by the processor, the driving profile to the set of driving rules to derive a set of suggested driving changes.

Embodiments include a computer system for modifying driving behavior, the computer system including a server having a processor, the processor configured to obtain driving data for a driver. The processor then configured to develop a driving profile based on the driving data for the driver, wherein the driving profile includes one or more driving behaviors. The processor then configured to obtain location data for the driver and obtaining a set of driving rules from one or more databases based upon the location data for the driver. Additionally, the processor configured to compare the driving profile to the set of driving rules to derive a set of suggested driving changes.

Embodiments also include a computer program product for modifying driving behavior, the computer program product including a non-transitory computer readable storage medium having program instructions embodied therewith, the program instructions executable by a processor to cause the processor to perform obtaining driving data for a driver. The program instructions executable by the processor to cause the processor to further perform developing a driving profile based on the driving data for the driver, wherein the driving profile includes one or more driving behaviors. The program instructions executable by the processor to cause the processor to further perform obtaining location data for the driver and obtaining a set of driving rules from one or more databases based upon the location data for the driver. Additionally, the program instructions executable by the processor to cause the processor to further perform comparing, by the processor, the driving profile to the set of driving rules to derive a set of suggested driving changes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
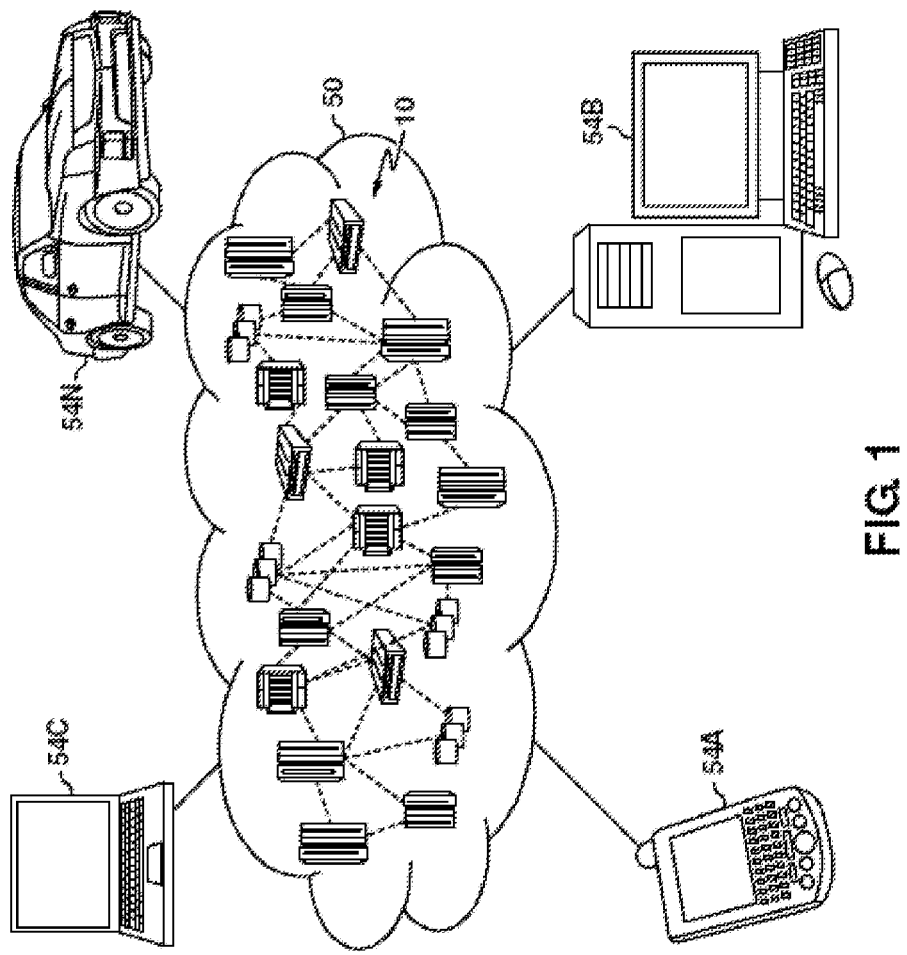
FIG. 1 depicts a cloud computing environment according to one or more embodiments of the present invention.

In accordance with exemplary embodiments of the disclosure, methods, systems and computer program products for modifying driving behavior are provided. Drivers often develop idiosyncratic driving behaviors based on the various traffic rules, customs, regulations, and laws that are specific to an area or political subdivision of a state, county or municipality where the driver typically drives. Some example driving behaviors include performing a right-hand turn at a red light and speeding through a yellow light while expecting a certain yellow light duration. In areas that are not typically frequented by the driver, certain rules, customs, regulations, and laws can be different. The invention described herein identifies the driving habits of a driver, compares the driving habits to the traffic rules, customs, and laws of the area the driver is operating a vehicle, and alerts the driver if there are any habits that are in conflict with the traffic rules, customs, and laws of the area. Additionally, the invention can alert the driver to any driving habits that may be hazardous based upon certain conditions present in the area where the driver is operating a vehicle.

Sensors can be utilized to collect driving data about a driver while operating a vehicle in an area that is known to the driver. This data can be analyzed to identify a driving profile for the driver that identifies driving behaviors. Traffic rules, customs, and laws can be accessed to determine location-specific traffic guidelines. For example, in a particular city, right-hand turns at an intersection with a red light are illegal. If the driving profile includes a driving behavior such as the driver will make a right-hand turn on a red light, the driver will be alerted to this traffic guideline to deter the driver from making a right-hand turn on a red light. As the driving data is collected, the driver profile is updated to include any new or changing driving behavior. Machine learning techniques can be used to train the driving data to develop and update a driving profile over time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
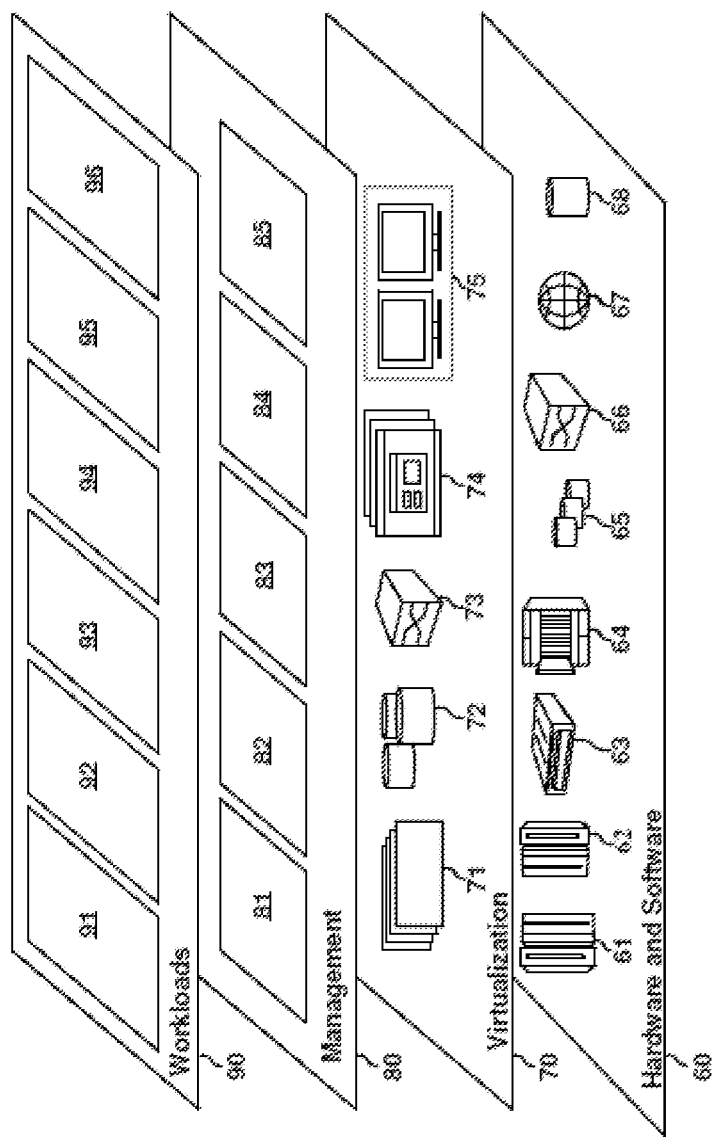
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and modifying driving behavior 96.

Figure 3:
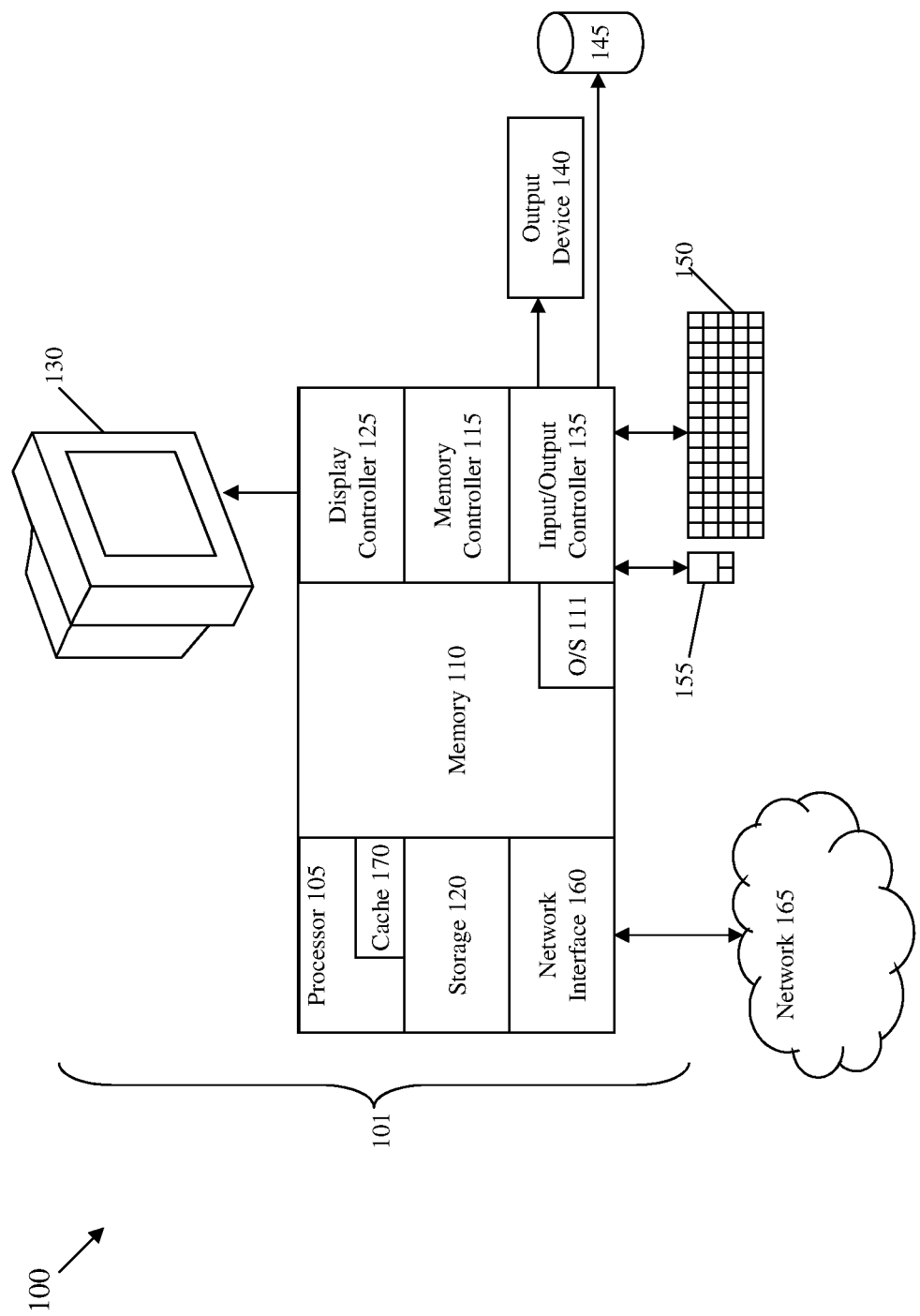
FIG. 3 illustrates a block diagram of a computer system for use in practicing the teachings herein.

FIG. 3 illustrates a block diagram of an exemplary computer system 100 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 3, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDD), solid state drives (SSD), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 3, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Figure 4:
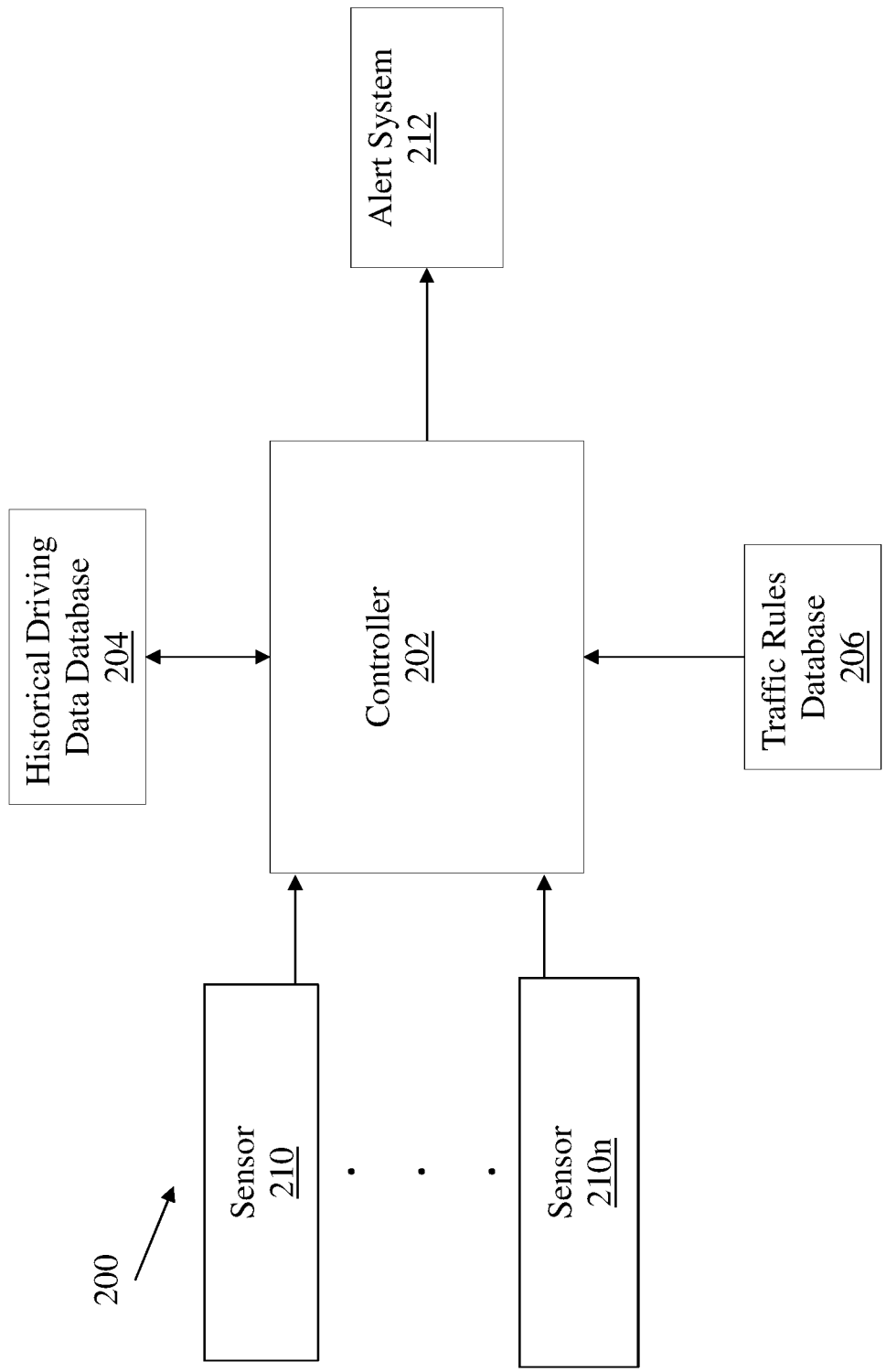
FIG. 4 illustrates a block diagram of a system for modifying driving behavior in accordance with one or more embodiments.

FIG. 4 illustrates a system 200 for modifying driving behavior according to one or more embodiments of the present invention. The system 200 includes a controller 202, a historical driving data database 204, a traffic rules database 206, one or more sensors 210-210n, and an alert system 212.

The one or more sensors 210-210n are configured to obtain driving data for a vehicle operated by a driver. The one or more sensors 210-210n can be any type of vehicle sensor such as, for example, a speed monitoring sensor, a global positioning system (GPS), a sonar sensor, an accelerometer, a gyroscopic sensor, or one or more cameras. The one or more cameras can be installed inside the cabin of the vehicle or be attached to the outside of the vehicle. The one more cameras can collect a series of images that can be interpreted by the controller 202 to determine a driving behavior. For example, if a series of images, taken from the sensors 210-210n, indicates that a driver has changed lanes on a highway, the controller 202 can look to the one or more sensors 210-210n to determine if a turn indicator (blinker) was utilized by the driver at the time the lane change occurred. A driving behavior can be determined based upon this failure to utilize a turn indicator while changing lanes. In this example, one instance of a lane change with no turn indicator being utilized may not associate this driving behavior with the driver. However, if this behavior is observed over a threshold number of times, the driving behavior can be saved to a driving profile for this driver.

In one or more embodiments, the sensors and cameras collect real-time data as a driver operates a vehicle. The system 200 develops a driving profile for the driver based on context gathered from driving data gathered from the sensors and cameras. The driving profile will include known (historical) driving practices of an individual based upon the obtained driving data from the one or more sensors 210-210n. Additionally, the one or more sensors 210-210n include a global positioning system (GPS) sensor which can track, in real-time, the vehicle location. As the vehicle travels from area to area, the traffic rules database 206 is accessed for local driving rules, customs, and laws common to the area the vehicle is located. The controller 202 accesses these rules and compares these rules with the driving profile, in the historical driving data database 204, to determine a set of suggested changes to send to the alert system 212. The alert system 212 can alert the driver via a visual signal, an audio signal, or a haptic signal. The visual signal can be, for example, a vehicle dashboard display to indicate a suggested driving behavior change. The audio signal can be, for example, a sound or a message played through the vehicle speakers. The haptic signal can be, for example, a vibration of the seat or steering wheel to indicate a suggested change to a driving behavior.

The traffic rules database 206 includes information about various traffic rules, customs, laws, and regulations that are specific to a driving area. Examples of a driving area can be states, counties, cities, and the like that may have different traffic rules. Some example traffic rules include prohibition against sending text messages from a mobile phone while operating a vehicle, utilize a handheld device while driving, utilizing a radar detector in a vehicle, making a right-hand turn on a red light, reduced speed limits through a school or construction zone, upcoming changes to a speed limit, historical ticket (traffic enforcement) information, turning on headlights during inclement weather, and laws requiring a vehicle to slow down or change lanes when an emergency vehicle is on the shoulder of a roadway.

In one or more embodiments, the one or more sensors 210-210n can include biometric sensors, such as a pulse sensor, a blood pressure sensor, a heart rate sensor, and the like. In addition, the sensors 210-210n can track head movement, eye movement, and other body part movements of the driver. From this tracking data, the controller 202 can determine a level of distraction of the driver or an indication of fatigue present in the driver while the driver is operating the vehicle. The alert system 212 can be used to alert the driver if his or her level of distraction is above a threshold value that would trigger an alert. For example, if the eye or head tracking sensor receives sensor data indicating that the driver has been looking down at a phone or electronic device for a certain period of time, an alert can be sent to the driver to focus the driver back to operating the vehicle without the level of distraction.

In one or more embodiments, the one or more sensors 210-210n can be utilized to collect unsafe driving behavior such as speeding, approaching a turn with too much velocity, crossing a center line in a road, or the like. When an unsafe driving behavior is observed by the sensors 210-210n, the alert system 212 can send an alert to the driver to curb the unsafe driving behavior.

In one or more embodiments, the alert system 212 can send the driver an alert before the driver partakes in an unsafe driving behavior. For example, if the system 200 identifies the driving behavior of speeding through a yellow or caution light at an intersection, the alert system can send the driver alert that this driving behavior is not allowed, is unsafe, or is otherwise not advisable in the area the driver is operating the vehicle. In this example, the traffic rules database 206 would provide information regarding yellow light timing for a specific geographic area. In some embodiments, the traffic rules database 206 can provide historical enforcement information such as a number of tickets issued for vehicles running a red light that can correlate to enforcement of drivers who speed through a yellow light.

Figure 5:
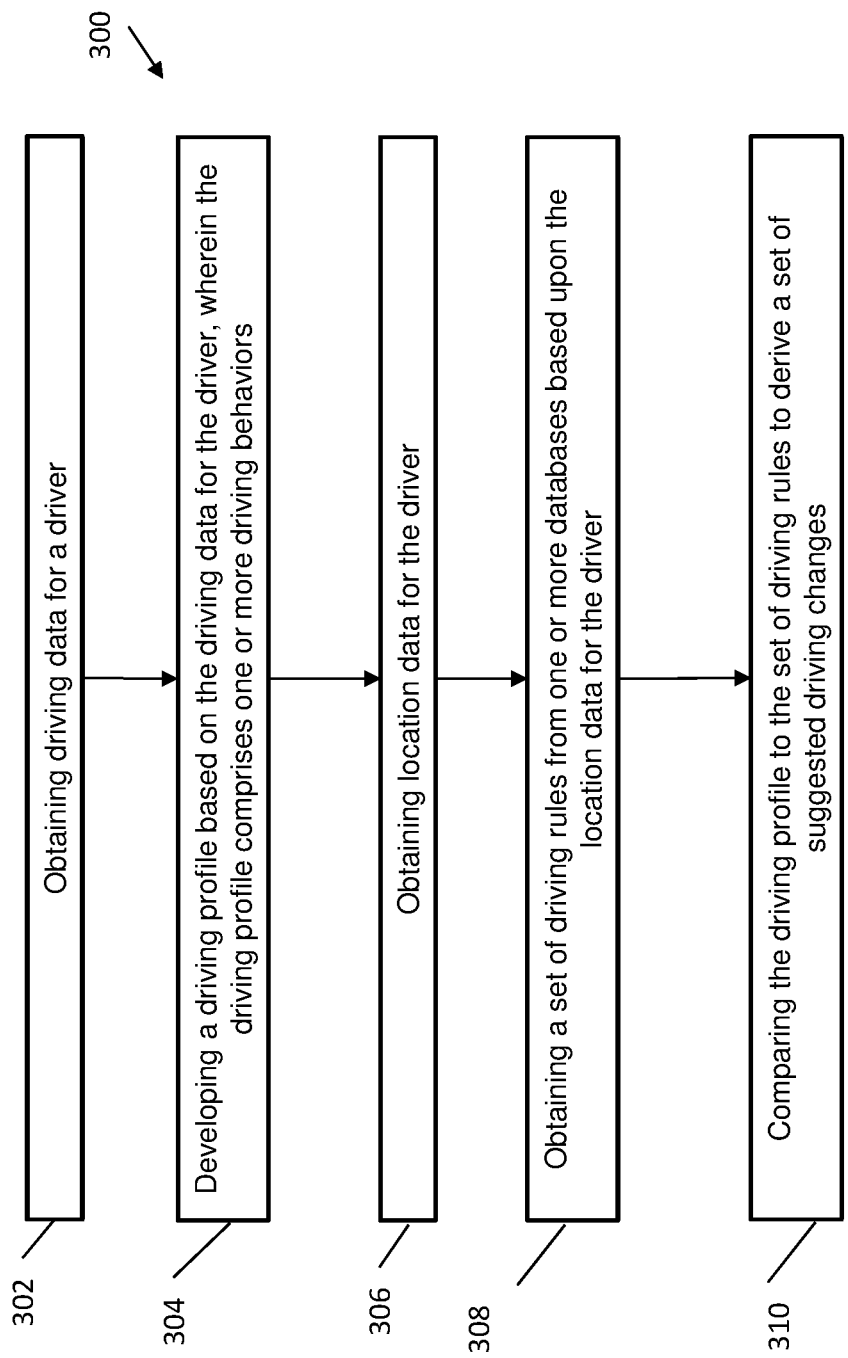
FIG. 5 illustrates a flow diagram of a method for modifying driving behavior in accordance with one or more embodiments.

FIG. 5 illustrates a flow diagram of a method 300 for modifying driving behavior according to one or more embodiments. The method 300 includes obtaining driving data for a driver, as shown at block 302. At block 304, the method 300 includes developing a driving profile based on the driving data for the driver, wherein the driving profile comprises one or more driving behaviors. The method 300, at block 306 includes obtaining location data for the driver. Next, at block 308, the method 300 includes obtaining a set of driving rules from one or more databases based upon the location data for the driver. At block 310, the method 300 includes comparing the driving profile to the set of driving rules to derive a set of suggested driving changes.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for modifying driving behavior, the method comprising:
    obtaining, by a processor operating an accelerometer associated with a motor vehicle, driving data for a driver of the motor vehicle, wherein the accelerometer is configured to obtain acceleration data for the motor vehicle;
    developing, by the processor, a driving profile based on the driving data for the driver, wherein the driving profile comprises one or more driving behaviors of the driver, wherein the one or more driving behaviors of the driver comprise driving habits exhibited by the driver over a threshold number of times;
    obtaining, via a global positioning sensor (GPS), location data for the driver, the location data comprising a location of the vehicle within a geographical region;
    determining a set of driving rules from one or more databases, wherein the set of driving rules comprise traffic rules data associated with the location of the vehicle within the geographical region, wherein the traffic rules data comprises historical traffic tickets issued within the geographical region;
    comparing, by the processor, the one or more driving behaviors to the set of driving rules to derive a set of suggested driving habit changes;
    displaying, on a dashboard display in the motor vehicle, the set of suggested driving habit changes;
    continuously obtaining, via the accelerometer, additional acceleration data associated with the driver;

determining, by the processor, a predicted action of the driver based at least in part on the additional acceleration data and the driver profile; and generating an alert to the driver based on a determination that the predicted action conflicts with the set of suggested driving habit changes, wherein the alert comprises a vibration of the steering wheel, and wherein the alert is sent to the driver prior to the driver taking the predicted action.

2. The method of claim 1, wherein the driver is a first driver, the driving profile is a first driving profile, the set of driving rules is a first set of driving rules, and the set of suggested driving habit changes is a first set of suggest driving habit changes, further comprising:

obtaining a second driving data for a second driver;

developing a second driving profile based on the second driving data for the second driver;

obtaining second location data for the second driver;

obtaining a second set of driving rules data from the one or more databases based upon the second location data for the second driver; and comparing the second driving profile to the second set of driving rules data to derive a second set of suggested driving changes.

3. The method of claim 1 further comprising:
monitoring the location data of the driver; and
updating the set of driving rules based on the location data.

4. The method of claim 1 further comprising:
sending one or more alerts to the driver based on the set of suggested driving habits changes.

5. The method of claim 4, wherein the one or more alerts comprise at least one of a visual alert, an audio alert, or a haptic alert.

6. The method of claim 1, wherein the driving data is obtained by one or more sensors communicatively coupled to a vehicle of the driver.

7. The method of claim 6, wherein the one or more sensors comprise at least one of a camera, a global positioning system (GPS) sensor, or a biometric sensor.

8. A computer system for modifying driving behavior, the computer system including a server having a processor, the processor configured to:

obtain, by the processor operating an accelerometer associated with a motor vehicle, driving data for a driver of the motor-a vehicle, wherein the accelerometer is configured to obtain acceleration data for the motor vehicle;

develop a driving profile based on the driving data for the driver, wherein the driving profile comprises one or more driving behaviors of the driver, wherein the one or more driving behaviors of the driver comprise driving habits exhibited by the driver over a threshold number of times;

obtain, via a global positioning sensor (GPS), location data for the driver, the location data comprising a location of the vehicle within a geographical region;

determine a set of driving rules from one or more databases, wherein the set of driving rules comprise traffic rules data associated with the location of the vehicle within the geographical region, wherein the traffic rules data comprises historical traffic tickets issued within the geographical region;

compare the one or more driving behaviors to the set of driving rules to derive a set of suggested driving habit changes;

display, on a dashboard display in the motor vehicle, the set of suggested driving habit changes;

continuously obtain, via the accelerometer, additional acceleration data associated with the driver;

determine predicted action of the driver based at least in part on the additional acceleration data and the driver profile; and generate an alert to the driver based on a determination that the predicted action conflicts with the set of suggested driving habit changes, wherein the alert comprises a vibration of the steering wheel, and wherein the alert is sent to the driver prior to the driver taking the predicted action.

9. The computer system of claim 8, wherein the driver is a first driver, the driving profile is a first driving profile, the set of driving rules is a first set of driving rules, and the set of suggested driving habit changes is a first set of suggest driving habit changes, wherein the processor is further configured to:

obtain a second driving data for a second driver;

develop a second driving profile based on the second driving data for the second driver;

obtain second location data for the second driver;

obtain a second set of driving rules data from the one or more databases based upon the second location data for the second driver; and compare the second driving profile to the second set of driving rules data to derive a second set of suggested driving changes.

10. The computer system of claim 8, wherein the processor is further configured to:
monitor the location data of the driver; and
update the set of driving rules based on the location data.

11. The computer system of claim 8, wherein the processor is further configured to:
send one or more alerts to the driver based on the set of suggested driving habit changes.

12. The computer system of claim 11, wherein the one or more alerts comprise at least one of a visual alert, an audio alert, or a haptic alert.

13. The computer system of claim 8, wherein the driving data is obtained by one or more sensors communicatively coupled to a vehicle of the driver.

14. The computer system of claim 13, wherein the one or more sensors comprise at least one of a camera, a global positioning system (GPS) sensor, or a biometric sensor.

15. A computer program product for modifying driving behavior, the computer program product comprising a non-transitory computer readable storage medium having program instructions embodied therewith, the program instructions executable by a processor to cause the processor to perform:

obtaining, by the processor operating an accelerometer associated with a motor vehicle, driving data for a driver of the motor vehicle, wherein the accelerometer is configured to obtain acceleration data for the motor vehicle;

developing, by the processor, a driving profile based on the driving data for the driver, wherein the driving profile comprises one or more driving behaviors of the driver, wherein the one or more driving behaviors of the driver comprise driving habits exhibited by the driver over a threshold number of times;

obtaining, via a global positioning sensor (GPS), location data for the driver, the location data comprising a location of the vehicle within a geographical region;

determining a set of driving rules from one or more databases, wherein the set of driving rules comprise traffic rules data associated with the location of the vehicle within the geographical region, wherein the traffic rules data comprises historical traffic tickets issued within the geographical region;

comparing the one or more driving behaviors to the set of driving rules to derive a set of suggested driving habit changes;

displaying, on a dashboard display in the motor vehicle, the set of suggested driving habit changes;

continuously obtaining, via the accelerometer, additional acceleration data associated with the driver;

determining, by the processor, a predicted action of the driver based at least in part on the additional acceleration data and the driver profile; and generating an alert to the driver based on a determination that the predicted action conflicts with the set of suggested driving habit changes, wherein the alert comprises a vibration of the steering wheel, and wherein the alert is sent to the driver prior to the driver taking the predicted action.

16. The computer program product of claim 15, wherein the driver is a first driver, the driving profile is a first driving profile, the set of driving rules is a first set of driving rules, and the set of suggested driving habit changes is a first set of suggest driving habit changes, wherein the program instructions executable by the processor cause the processor to further perform:

obtaining a second driving data for a second driver;

developing a second driving profile based on the second driving data for the second driver;

obtaining second location data for the second driver;

obtaining a second set of driving rules data from the one or more databases based upon the second location data for the second driver; and comparing the second driving profile to the second set of driving rules data to derive a second set of suggested driving changes.

17. The computer program product of claim 15 wherein the program instructions executable by the processor cause the processor to further perform:

monitoring the location data of the driver; and updating the set of driving rules based on the location data.

18. The computer program product of claim 15 wherein the program instructions executable by the processor cause the processor to further perform:

sending one or more alerts to the driver based on the set of suggested driving habit changes.

19. The computer program product of claim 18, wherein the one or more alerts comprise at least one of a visual alert, an audio alert, or a haptic alert.

20. The computer program product of claim 15, wherein the driving data is obtained by one or more sensors communicatively coupled to a vehicle of the driver.

* * * * *